United States Patent
Shiwalkar et al.

(10) Patent No.: US 9,053,010 B2
(45) Date of Patent: Jun. 9, 2015

(54) CACHE SYSTEM USING SOLID STATE DRIVE

(71) Applicant: MARVELL WORLD TRADE LTD., St. Michael (BB)

(72) Inventors: Shailesh Shiwalkar, Santa Clara, CA (US); Hy Dinh Vu, Milpitas, CA (US); Jagadish K. Mukku, Sunnyvale, CA (US); Sandeep Karmarkar, Pune (IN); Anil Goyal, San Ramon, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 146 days.

(21) Appl. No.: 13/747,041

(22) Filed: Jan. 22, 2013

(65) Prior Publication Data

US 2013/0191582 A1 Jul. 25, 2013

Related U.S. Application Data

(60) Provisional application No. 61/589,187, filed on Jan. 20, 2012.

(51) Int. Cl.
*G06F 12/00* (2006.01)
*G06F 12/02* (2006.01)
*G06F 12/08* (2006.01)

(52) U.S. Cl.
CPC ........ *G06F 12/0246* (2013.01); *G06F 12/0895* (2013.01)

(58) Field of Classification Search
CPC ............ G06F 12/0246; G06F 11/1072; G06F 2212/7202; G06F 2212/7203; G06F 2212/7205; G06F 2212/7208; G06F 12/0804; G06F 12/0895; G06F 2212/2022; G06F 2212/214; G06F 12/08; G06F 2212/225; G06F 12/0868; G06F 2212/222; G06F 12/0871

USPC .................................................. 711/103, 118
See application file for complete search history.

(56) References Cited

U.S. PATENT DOCUMENTS

| | | | |
|---|---|---|---|
| 7,634,615 B2 | 12/2009 | Sutardja | |
| 7,702,848 B2 | 4/2010 | Sutardja et al. | |
| 7,788,427 B1 | 8/2010 | Yang | |
| 7,979,614 B1 | 7/2011 | Yang | |
| 8,171,207 B2* | 5/2012 | Chang et al. | 711/103 |
| 8,296,487 B1 | 10/2012 | Yoon et al. | |
| 8,296,555 B2 | 10/2012 | Chu et al. | |

(Continued)

OTHER PUBLICATIONS

International Search Report and Written Opinion in corresponding PCT/IB2013/000492 dated Jul. 18, 2013.

(Continued)

*Primary Examiner* — Hashem Farrokh

(57) ABSTRACT

A cache system for a storage device includes (i) one or more solid state drives (SSDs), (ii) one or more random access memories (RAMs), and (iii) a cache control device. The cache control device caches at least some of first data that is to be written to the storage device, and caches at least some of second data that is retrieved from the storage device. When caching first data or second data in one of the one or more RAMs, the cache control device writes to the one RAM non-sequentially with respect to a memory space of the one RAM. When caching first data or second data in one of the one or more SSDs, the cache control device writes to the one SSD sequentially with respect to a memory space of the one SSD.

18 Claims, 5 Drawing Sheets

(56) References Cited

U.S. PATENT DOCUMENTS

| | | | |
|---|---|---|---|
| 8,327,066 B2 * | 12/2012 | Heo et al. | 711/103 |
| 8,327,076 B2 * | 12/2012 | Murphy et al. | 711/136 |
| 8,612,668 B2 * | 12/2013 | Nishimoto et al. | 711/103 |
| 2010/0293337 A1 | 11/2010 | Murphy et al. | |
| 2011/0022801 A1 | 1/2011 | Flynn | |
| 2011/0082967 A1 | 4/2011 | Deshkar et al. | |
| 2011/0276746 A1 | 11/2011 | Pruthi et al. | |
| 2012/0303862 A1 * | 11/2012 | Benhase et al. | 711/103 |
| 2013/0086324 A1 * | 4/2013 | Soundararajan et al. | 711/122 |

OTHER PUBLICATIONS

International Preliminary Report on Patentability in corresponding PCT/IB2013/000492, dated Jul. 22, 2014.

* cited by examiner

CACHE SYSTEM USING SOLID STATE DRIVE

CROSS-REFERENCES TO RELATED APPLICATIONS

This disclosure claims the benefit of U.S. Provisional Patent Application No. 61/589,187, entitled "High Performance Cache Where SSD Is Used as Primary Cache Device," filed on Jan. 20, 2012, the disclosure of which is incorporated herein by reference.

FIELD OF THE DISCLOSURE

The present disclosure relates generally to cache systems for storage devices and, more particularly, to cache systems that utilize a solid state drive.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Solid state drives (SSDs) are data storage devices that utilize integrated circuit memory to store data. Unlike magnetic and optical disk drives, SSDs do not employ any moving mechanical components. Many SSDs use flash memory, which retains data without power. Other SSDs utilize random-access memory (RAM). RAM-based SSDs may employ separate power sources, such as batteries, to maintain data after power loss.

One limitation of flash memory is that, after a bit has been set to logic zero, the bit can only be reset to logic one by "erasing" an entire block in which the bit is located, where the block includes many kilobytes of data. In other words, in order to re-write a byte of data, many kilobytes of data must first be erased. Erasing a block typically involves setting all bits in the block to logic one. With a freshly erased block, any location within that block can then be programmed.

Another limitation of flash memory is that flash memory degrades after a number of program-erase (P/E) cycles. Some commercially available flash devices are guaranteed to withstand around 100,000 P/E cycles, but then wear begins to deteriorate the integrity of the flash device.

SUMMARY

In an embodiment, an apparatus comprises a cache system for a storage device, the cache system including (i) one or more solid state drives (SSDs), (ii) one or more random access memories (RAMs), and (iii) a cache control device. The cache control device is configured to receive first data that is to be written to the storage device, the first data associated with a request to write the first data to the storage device, store at least some of the first data in one or both of (i) the one or more SSDs and (ii) the one or more RAMs, retrieve second data from the storage device in response to a request to read data from the storage device, store at least some of the second data in one or both of (i) the one or more SSDs and (ii) the one or more RAMs, when storing first data or second data in one of the one or more RAMs, write to the one RAM non-sequentially with respect to a memory space of the one RAM, and when storing first data or second data in one of the one or more SSDs, write to the one SSD sequentially with respect to a memory space of the one SSD.

In other embodiments, the apparatus further comprises any combination of one or more of the following features.

The cache control device comprises a cache engine configured to receive a request to overwrite old data already in the storage device with second data, and in response to the request overwrite old data in the storage device, (i) determine whether the old data is in the one or more RAMs, and (ii) determine whether the old data is in the one or more SSDs. The cache control device also comprises a RAM interface device configured to if the old data is in the one or more RAMs, overwrite the old data in the one or more RAMs with second data, and if the old data to be overwritten is not in the one or more RAMs, (i) allocate a chunk in the one or more RAMS, and (ii) write second data to the allocated chunk. The cache control device further comprises an SSD interface device configured to, if the old data is in the one or more SSDs, mark the old data in the one or more SSDs as invalid.

The SSD interface device is configured to allocate chunks in each of the one or more SSDs sequentially with respect to the memory space of the SSD, and the cache control device comprises a data transfer device configured to determine when a chunk of one of the one or more RAMs is full, when the chunk of the RAM is full, cause the SSD interface device to allocate a new chunk in the SSD, and cause data in the chunk of the RAM to be written to the new chunk in the SSD.

The data transfer device is included in the RAM interface device.

The SSD interface device is configured to discard chunks in each of the one or more SSDs sequentially with respect to the memory space of the SSD.

The SSD interface device is configured to discard one or more chunks in each of the one or more SSDs that were last allocated prior to the most recent allocations of all other chunks in the SSD.

At least one of the one or more SSDs comprises a flash memory device.

At least one of the one or more RAMs comprises a non-volatile RAM device.

The non-volatile RAM device comprises at least one of (i) a battery or (ii) a super capacitor.

The cache control device comprises one or more integrated circuits.

The cache control device comprises a memory to store machine readable instructions, and a processor coupled to the memory, the processor configured to execute the machine readable instructions.

In another embodiment, a method includes receiving first data that is to be written to a storage device, the first data associated with requests to write first data to the storage device. The method also includes storing at least some of the first data in a cache device comprising (i) a solid state drive (SSD), and (ii) a random access memory (RAM). Storing first data to the SSD comprises writing sequentially to the SSD with respect to a memory space of the SSD, and storing first data to the RAM comprises writing non-sequentially to the RAM with respect to a memory space of the RAM. The method further includes retrieving second data from the storage device in response to requests to read data from the storage device, and storing at least some of the second data in the cache device. Storing second data to the SSD comprises writing sequentially to the SSD with respect to a memory space of the SSD, and storing first data to the RAM comprises writing non-sequentially to the RAM with respect to a memory space of the RAM.

In other embodiments, the method further comprises any combination of one or more of the following features.

The method further comprises determining whether first data corresponds to old data already stored in the RAM, and, overwriting old data in the RAM with the first data corresponding to the old data when it is determined that first data corresponds to the old data already stored in the RAM.

The method further comprises determining whether first data corresponds to old data already stored in the SSD, and marking old data in the SSD that corresponds to first data as invalid when it is determined that first data corresponds to the old data already stored in the SSD.

The method further comprises, when it is determined (i) that first data does not corresponds to old data already stored in the RAM, and (ii) that first data corresponds to old data already stored in the SSD, writing first data to a chunk in the RAM.

The method further comprises determining when a chunk in the RAM is full, and, when it is determined that the chunk in the RAM is full, (i) allocating a chunk in the SSD according to an order corresponding to the memory space of the SSD, and (ii) copying data from the chunk in the RAM to the allocated chunk in the SSD.

The method further comprises determining when free space in the SSD is does not meet a threshold, and, when it is determined that the free space in the SSD does not meet the threshold, discarding one or more oldest chunks in the SSD, the oldest chunks corresponding to chunks that were last allocated prior to the most recent allocations of all other chunks in the SSD.

Discarding the one or more oldest chunks in the SSD comprises erasing the one or more chunks.

The method further comprises allocating chunks in the SSD sequentially with respect to the memory space of the SSD.

The method further comprises discarding chunks in the SSD sequentially with respect to the memory space of the SSD.

DETAILED DESCRIPTION

Embodiments described herein generally relate to a cache system for a storage device. The cache system comprises (i) one or more solid state drives (SSDs), and (ii) one or more random access memories (RAMs). The cache system receives requests to write data to the storage device such requests are sometimes referred to herein as "write requests." Similarly, the cache system receives requests to read data from the storage device—such requests are sometimes referred to herein as "read requests." The cache system stores, in the one or more SSDs and/or the one or more RAMS, at least some of the data that is to be stored in the storage device or read from the storage devices. When storing data in an SSD, the cache system is configured to write to the SSD sequentially with respect to a memory space of the SSD. On the other hand, when storing data in a RAM, the cache system is configured to write to the RAM non-sequentially. In some embodiments, the cache system is configured to allocate blocks in the SSD sequentially with respect to the memory space of the SSD. In some embodiment, the cache system is configured to erase blocks in the SSD sequentially with respect to the memory space of the SSD.

In an embodiment, writing to the SSD sequentially with respect to the memory space of the SSD comprises writing to the SSD according to an order of increasing addresses in the address space. In an embodiment, writing to the SSD sequentially with respect to the memory space of the SSD comprises writing to the SSD according to an order of decreasing addresses in the address space. In an embodiment, allocating blocks in the SSD sequentially with respect to the memory space of the SSD comprises allocating blocks in the SSD according to an order of increasing addresses in the address space. In an embodiment, allocating blocks in the SSD sequentially with respect to the memory space of the SSD comprises allocating blocks in the SSD according to an order of decreasing addresses in the address space.

Figure 1:
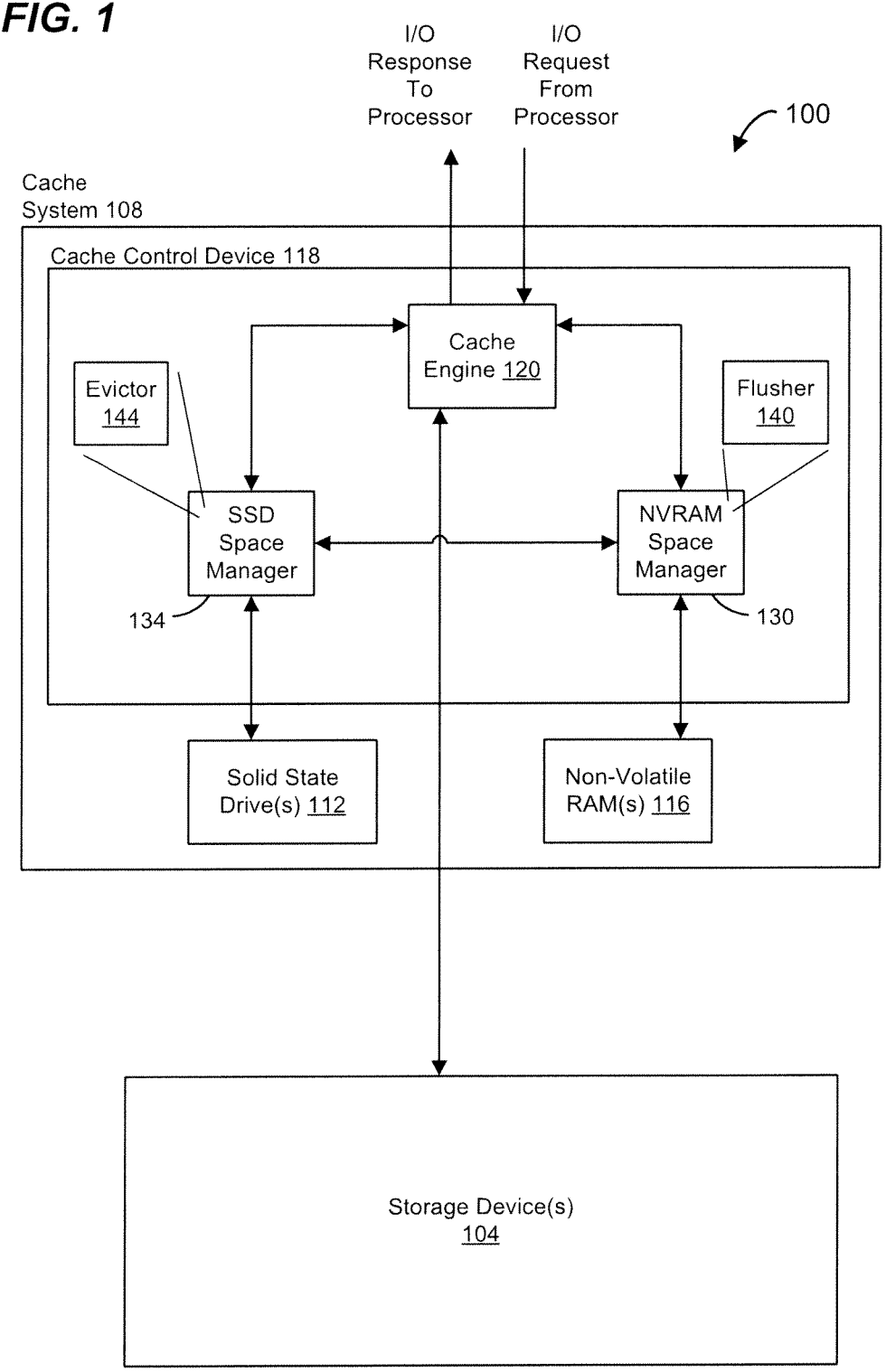
FIG. 1 is a block diagram of an example storage system including a cache system having an SSD and a RAM, according to an embodiment.

FIG. 1 is a block diagram or an example storage system 100, according to an embodiment. The storage system 100 includes one or more storage devices 104 coupled to a cache system 108. The one or more storage devices 104 includes a disk drive (e.g., a magnetic disk drive, an optical disk drive, etc.), in an embodiment. The one or more storage devices 104 include one or more other suitable storage devices in other embodiments. In some embodiments, the one or more storage devices 104 are communicatively coupled to the cache system 108 via one or more busses, via a wired or wireless communication link, etc. In some embodiments, the one or more storage devices 104 include one more storage area network (SAN) devices, one or more network attached storage (NAS) devices, etc., and the one or more storage devices 104 are communicatively coupled to the cache system 108 via one or more network links. For brevity, the one or more storage devices 104 will be referred to as "the storage device 104."

The cache system 108 includes one or more SSDs 112 and one or more RAMs 116. In some embodiments, the one or more RAMs include one or more non-volatile RAMs (NVRAMs), such as a battery backed-up RAM, a RAM with a super capacitor, etc. For brevity, the one or more SSDs 112 will be referred to herein as "the SSD 112" and the one or more RAMs 116 will be referred to herein as "the NVRAM 116." The SSD 112 and the RAM 116 are collectively referred to as a "cache device."

The cache system 108 also includes a cache control device 118. The cache control device 118 includes a cache engine 120 that receives write requests from a processor, the write requests being requests to write data to the storage device 104. The cache engine 120 is configured to determine, in response to receiving a write request, whether to write data associated with the write request to (i) the storage device 104, and/or (ii) the cache device using a suitable technique. When it is determined to write data to the cache device, the cache engine 120 manages storage of the data to the cache device, as described in more detail below.

The cache engine 120 also receives read requests from the processor, the read requests being requests to read data from the storage device 104. The cache engine 120 is configured to determine, in response to receiving a read request, whether the requested data associated with the read request is stored in the cache device using a suitable technique. When the requested data is stored in the cache device, the cache engine 120 is configured to retrieve the requested data from the cache device and provide the retrieved data to the processor. When the requested data is not stored in the cache device, the cache engine 120 is configured to retrieve the requested data from the storage device 104 and provide the retrieved data to the processor. The cache engine 120 is also configured to store the data retrieved from the storage device 104 in the cache device.

The cache control device 118 further includes an NVRAM space manager device 130 coupled to the NVRAM 116 and to the cache engine 120. The NVRAM space manager 130 is an interface device configured to read data from the NVRAM 116 in response to a read request from the cache engine 120. Additionally, the NVRAM space manager 130 is configured to write data to the NVRAM 116 in response to a write request from the cache engine 120. Further, the NVRAM space manager 130 is configured to allocate chunks in the NVRAM 116. In an embodiment, a chunk is a contiguous large block of memory. In an embodiment, a chunk has a size equal to at least 256 kilobytes. In other embodiments, a chunk has another suitable size less than or greater than 256 kilobytes.

The cache control device 118 also includes an SSD space manager device 134 coupled to the SSD 112 and to the cache engine 120. The SSD space manager 134 is an interface device configured to read data from the SSD 112 in response to a read request from the cache engine 120. Additionally, the SSD space manager 134 is configured to write data to the SSD 112 in response to a write request from the cache engine 120. Further, the SSD space manager 134 is configured to allocate chunks in the SSD 112 in a sequential order with respect to a memory space of the SSD 112. As discussed above, a chunk is a contiguous large (e.g., at least 256 kilobytes, in an embodiment) block of memory. In an embodiment, the size of chunks in the NVRAM 116 is the same as the size of chunks in the SSD 112.

Figure 2:
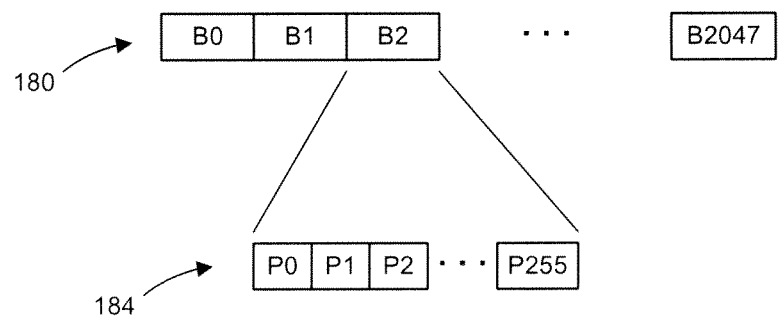
FIG. 2 is a diagram of a memory space of the SSD of FIG. 1, according to an embodiment.
Figure 3:
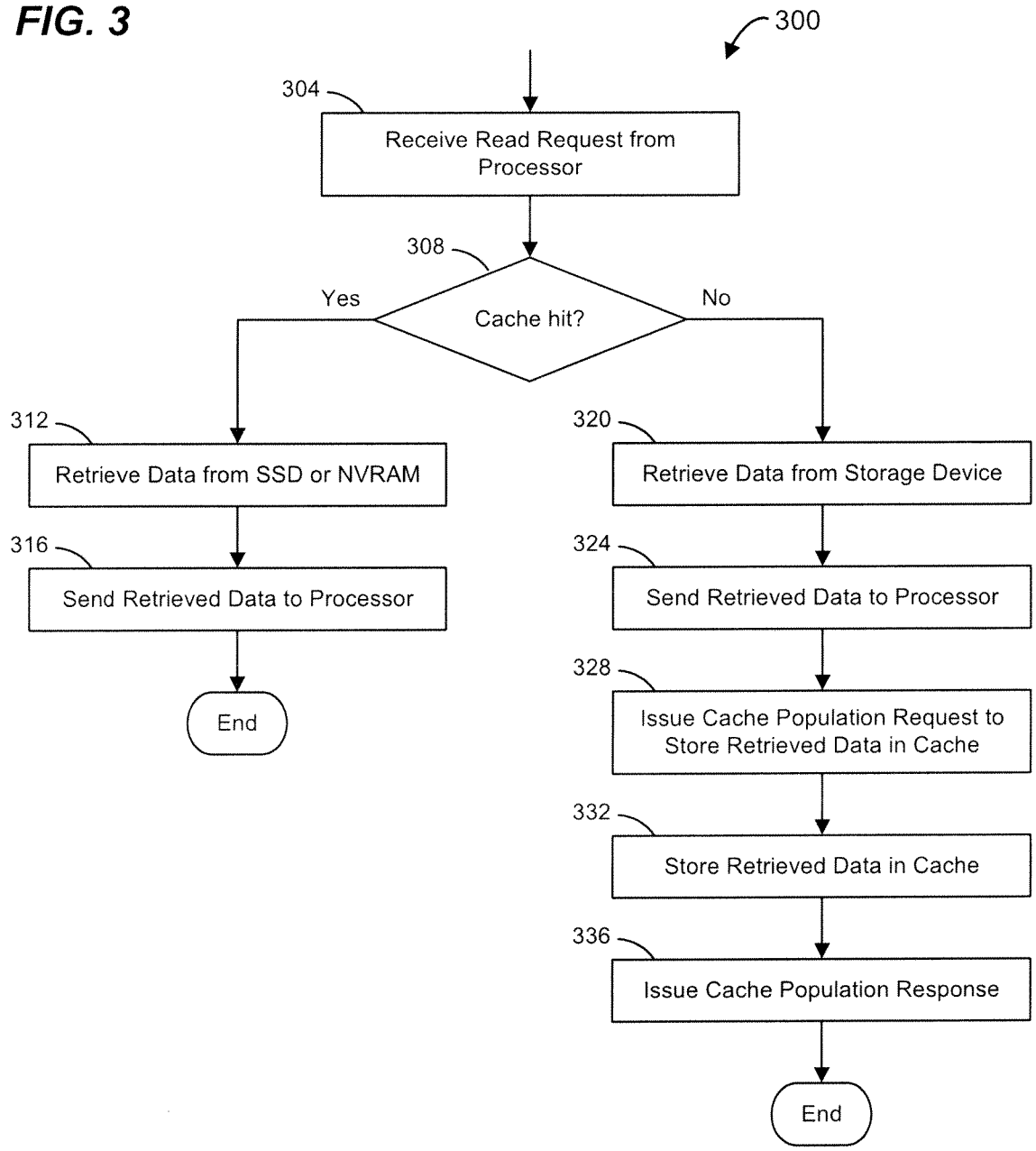
FIG. 3 is a flow diagram of an example method, implemented by the cache system of FIG. 1, for responding to a read request, according to an embodiment.

FIG. 2 is a diagram of an example memory space architecture of the SSD 112, according to an embodiment. The memory space is organized into a plurality of ordered blocks 180. In the example of FIG. 3, the memory space is organized as 2048 sequential blocks 180 (e.g. block 0, block 1, . . . , block 2047). In other embodiments, the memory space is organized into another suitable number of blocks. In an embodiment, a chunk of the SSD 112 equals one or more blocks.

Each block 180 comprises a plurality of ordered pages 184. In the example of FIG. 3, each block 180 includes 256 sequential pages 184 (e.g., page 0, page 1, . . . , page 255). In other embodiments, each block 180 includes another suitable number of pages 184. In one embodiment, each page 184 includes 4 kilobytes of memory locations. In other embodiments, each page 184 includes another suitable number of memory locations.

Referring now to FIGS. 1 and 2, the SSD space manager 134 is configured to allocate chunks in sequential order, in an embodiment. For example, the SSD space manager 134 is configured to allocate blocks 180 in the following order: B0, B1, B2, . . . , B2047. After allocating B2047, the SSD space manager 134 is configured to continue allocating blocks 180 starting again at B0, in an embodiment. The SSD space manager 134 is configured to write to the SSD 112 in sequential order, in an embodiment. For example, the space manager 134 is configured to write to the SSD 112 in the following order: B0, B1, B2, . . . , B2047, in an embodiment. After writing to B2047, the SSD space manager 134 is configured to continue writing at B0, in an embodiment. Within each block 180, the SSD space manager 134 is configured to write to the pages 184 within the block 180 in sequential order, in an embodiment. For example, the space manager 134 is configured to write to pages 184 within each block 180 in the following order: P0, P1, P2, . . . , P255, in an embodiment. Within each page 184, the SSD space manager 134 is configured to write to the memory locations within the page 184 in sequential order, in an embodiment. For example, the space manager 134 is configured to write to memory locations within each page 0 in the following order: memory location 0, memory location 1, memory location 1, etc., in an embodiment.

The cache control device 118 also includes a flusher 140. In an embodiment, the flusher 140 is included in the NVRAM space manager 130. In other embodiments, the flusher 140 is separate from the NVRAM space manager 130. The flusher 140 is a data transfer device configured to determine when a chunk in the NVRAM 116 is full, in an embodiment. Determining when a chunk in the NVRAM 116 is full comprises determining that every memory location in the chunk has been written to since the most recent allocation of the chunk. In an embodiment. Determining when a chunk in the NVRAM 116 is full comprises determining that at least a certain number of memory locations in the chunk have been written to since the most recent allocation of the chunk, in an embodiment. For example, determining when a chunk in the NVRAM 116 is full comprises determining that at least 95% of the memory locations in the chunk have been written to since the most recent allocation of the chunk, in an embodiment. In other embodiments, a suitable percentage other than 95% is utilized. Determining when a chunk in the NVRAM 116 is full comprises determining whether a number of memory locations in the chunk that have been written to since the most recent allocation of the chunk meets a threshold, in an embodiment.

The flusher device 140 is configured to, when a chunk in the NVRAM 116 is determined to be full, copy write data from the chunk in the NVRAM 116 to a corresponding chunk in the SSD 112, in an embodiment.

The cache control device 118 also includes an evictor 144. In an embodiment, the evictor 144 is included in the SSD space manager 134. In other embodiments, the evictor 144 is separate from the SSD space manager 134. The evictor 144 is a device configured to determine when free space in the SSD 112 is low, in an embodiment. Determining when free space in the SSD 112 is low comprises determining that at least a certain number of blocks in the SSD 112 are allocated, in an embodiment. For example, determining whether free space in the SSD 112 comprises determining that at least 90% of the blocks in the SSD are allocated, in an embodiment. In other embodiments, a suitable percentage other than 90% is utilized. Determining whether free space in the SSD 112 is full comprises determining whether a number of un-allocated chunks in the SSD 112 meets a threshold, in an embodiment. Determining whether free space in the SSD 112 is full comprises determining whether a number of allocated chunks in the SSD 112 meets a threshold, in another embodiment.

The evictor 144 is configured to, when free space in the SSD 112 is determined to be low, discard one or more chunks in the SSD 112, in an embodiment. For example, the evictor 144 is configured to erase one or more blocks of which the one or more chunks are comprised, in an embodiment. Additionally, the evictor 144 is configured to indicate that the one or more erased chunks are no longer allocated.

The evictor 144 is configured to discard one or more chunks in the SSD 112 that were last allocated prior to the most recent allocations of all other chunks in the SSD 112, in an embodiment. The evictor 144 is configured to discard one or more chunks in the SSD 112 in a sequential manner with respect to the memory space of the SSD 112, in an embodiment. For example, if block B11 was last allocated prior to all other blocks in the SSD 112, then B11 will be the next block to be discarded, in an embodiment. Block B12 will then become the last block allocated prior to all other blocks in the SSD 112, and thus block B12 will be the next block to be discarded, in an embodiment. As another example, if block B2047 was last allocated prior to all other blocks in the SSD 112, then B2047 will be the next block to be discarded, in an embodiment. Block B0 will then become the last block allocated prior to all other blocks in the SSD 112, and thus block B0 will be the next block to be discarded, in an embodiment.

FIG. 3 is a flow diagram of an example method 300, implemented by a cache system, for responding to a read request, according to an embodiment. For example, the method 300 is implemented by the cache system 108 of FIG. 1, in an embodiment, and the method 300 is described with reference to FIG. 1 for ease of explanation. In other embodiments, however, the method 300 is implemented by other suitable cache systems that include one or more SSDs and one or more RAMs.

At block 304, a read request is received from a processor. The read request includes an indication or indications of one or more memory locations in the storage device 104, in an embodiment.

At block 308, it is determined whether the cache device (e.g., whether the SSD 112 and/or the NVRAM 116) includes data corresponding to the read request. For instance, it is determined whether the requested data stored at the indicated memory location(s) of the storage device 104 is also stored in the SSD 112 and/or the NVRAM 116, in an embodiment.

If it is determined at block 308 that the cache device includes (e.g., that the SSD 112 and/or the NVRAM 116 includes) data corresponding to the read request, the flow proceeds to block 312. At block 312, data corresponding to the read request is retrieved from the cache device (e.g., from the SSD 112 or the NVRAM 116). At block 316, the retrieved data is sent to the processor in response to the read request received at block 304.

On the other hand, if it is determined at block 308 that the cache device does not include (e.g., that neither the SSD 112 nor the NVRAM 116 includes) data corresponding to the read request, the flow proceeds to block 320. At block 320, the requested data is retrieved from the storage device 104. At block 324, the retrieved data is sent to the processor in response to the read request received at block 304.

At block 328, a request to store the data retrieved at block 320 is issued. A request to store data in the cache device is sometimes referred to herein as a "cache population request." At block 332, the data retrieved at block 320 is stored in the cache device (e.g., in the SSD 112 and/or the NVRAM 116) in response to the cache population request issued at block 328. Storing data in the cache device in response to a cache population request will be described in more detail below. At block 336, a response to the cache population request is issued. For example, in an embodiment, when the retrieved data is successfully stored in the cache device, the response is issued to indicate that the retrieved data was successfully stored in the cache device. A response to a cache population request is sometimes referred to herein as a "cache population request response."

In other embodiments, the method 300 is modified in various suitable ways. For instance, the order of blocks is changed, one or more blocks are omitted, one or more blocks are added, etc., in various embodiments. As an example, block 324 is performed in parallel with or after block 332, in some embodiments. As another example, block 336 is omitted, in an embodiment. As a further example, the method 300 further includes a block prior to block 328 at which it is determined whether to store retrieved data in the cache device, and blocks 328, 332, and 336 are not performed when it is determined that the retrieved data should not be stored in the cache device, according to an embodiment.

The cache control system 118 is configured to implement the method 300, in an embodiment. For example, the cache engine 120 is configured to implement blocks 304, 308, 312, 316, 320, 324, and 328, in an embodiment. The cache engine 120 is also configured to implement block 332, in an embodiment. The SSD space manager 134 is configured to implement blocks 332 and 336 when data is stored in the SSD 112, in an embodiment. The NVRAM space manager 130 is configured to implement blocks 332 and 336 when data is stored in the NVRAM 116, in an embodiment.

Figure 4:
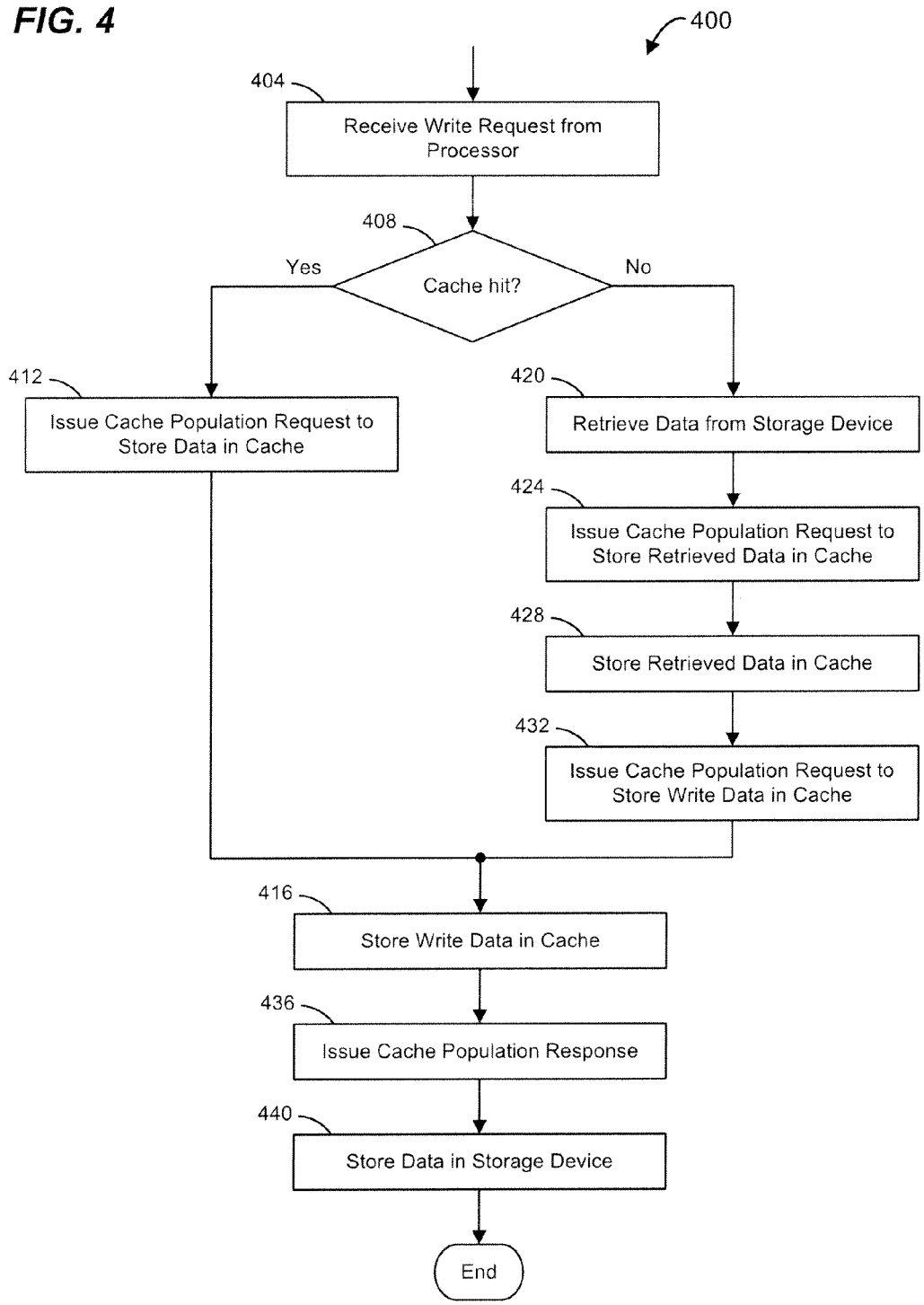
FIG. 4 is a flow diagram of an example method, implemented by the cache system of FIG. 1, for responding to a write request, according to an embodiment.

FIG. 4 is a flow diagram of an example method 400, implemented by a cache system, for responding to a write request, according to an embodiment. For example, the method 400 is implemented by the cache system 108 of FIG. 1, in an embodiment, and the method 400 is described with reference to FIG. 1 for ease of explanation. In other embodiments, however, the method 400 is implemented by other suitable cache systems that include one or more SSDs and one or more RAMs.

At block 404, a write request is received from a processor. The write request includes an indication or indications of one or more memory locations in the storage device 104, in an embodiment. The write request also includes data to be written (referred to herein as "write data"), in an embodiment.

At block 408, it is determined whether the cache device (e.g., whether the SSD 112 and/or the NVRAM 116) includes data corresponding to the write request. For instance, it is determined whether the data from the indicated memory location(s) of the storage device 104 is also stored in the SSD 112 and/or the NVRAM 116, in an embodiment.

If it is determined at block 408 that the cache device includes (e.g., that the SSD 112 and/or the NVRAM 116 includes) data corresponding to the write request, the flow proceeds to block 412. At block 412, a cache population request to store the write data associated with the write request is issued. At block 416, the write data is stored in the cache device (e.g., in the SSD 112 and/or the NVRAM 116) in response to the cache population request issued at block 412. Storing data in the cache device in response to a cache population request will be described in more detail below.

On the other hand, if it is determined at block 408 that the cache device does not include (e.g. that neither the SSD 112 nor the NVRAM 116 includes) data corresponding to the write request, the flow proceeds to block 420. At block 420, data corresponding to the write request is retrieved from the storage device 104. For instance, a suitable unit of data locations that includes the memory location(s) corresponding to the write data is retrieved from the storage device 104, in an embodiment. As an example, a page that includes the memory location(s) corresponding to the write data is retrieved from the storage device 104, in an embodiment. As another example, a block that includes the memory location(s) corresponding to the write data is retrieved from the storage device 104, in another embodiment.

At block 424, a cache population request to store the data retrieved at block 420 is issued. At block 428, the data retrieved at block 420 is stored in the cache device (e.g., in the SSD 112 and/or the NVRAM 116) in response to the cache population request issued at block 424.

At block 432, a cache population request to store the write data associated with the write request receive at block 404 is issued.

At block 436, a cache population request response is issued. For example, in an embodiment, when the retrieved data is successfully stored in the cache device, the cache population request response is issued to indicate that the retrieved data was successfully stored in the cache device.

At block 440, the write data is also stored in the storage device 104.

In other embodiments, the method 400 is modified in various suitable ways. For instance, the order of blocks is changed, one or more blocks are omitted, one or more blocks are added, etc. in various embodiments. As an example, blocks 420, 424, 428, and 432 are omitted, in some embodiments. For example, with a "no-write allocate," cache technique, if it is determined at block 408 that the cache device does not include (e.g., that neither the SSD 112 nor the NVRAM 116 includes) data corresponding to the write request, the flow ends, in an embodiment.

As another example, block 440 is omitted, in an embodiment. For example, block 440 is omitted when implementing a "write-back," cache technique, in an embodiment.

The cache control system 118 is configured to implement the method 400, in an embodiment. For example, the cache engine 120 is configured to implement blocks 404, 408, 412, 420, 424, 428, 432 and 440, in an embodiment. The cache engine 120 is also configured to implement blocks 416 and 428, in an embodiment. The SSD space manager 134 is configured to implement blocks 416, 428, and 426 when data is stored in the SSD 112, in an embodiment. The NVRAM space manager 130 is configured to implement blocks 416, 428, and 426 when data is stored in the NVRAM 116, in an embodiment.

Figure 5:
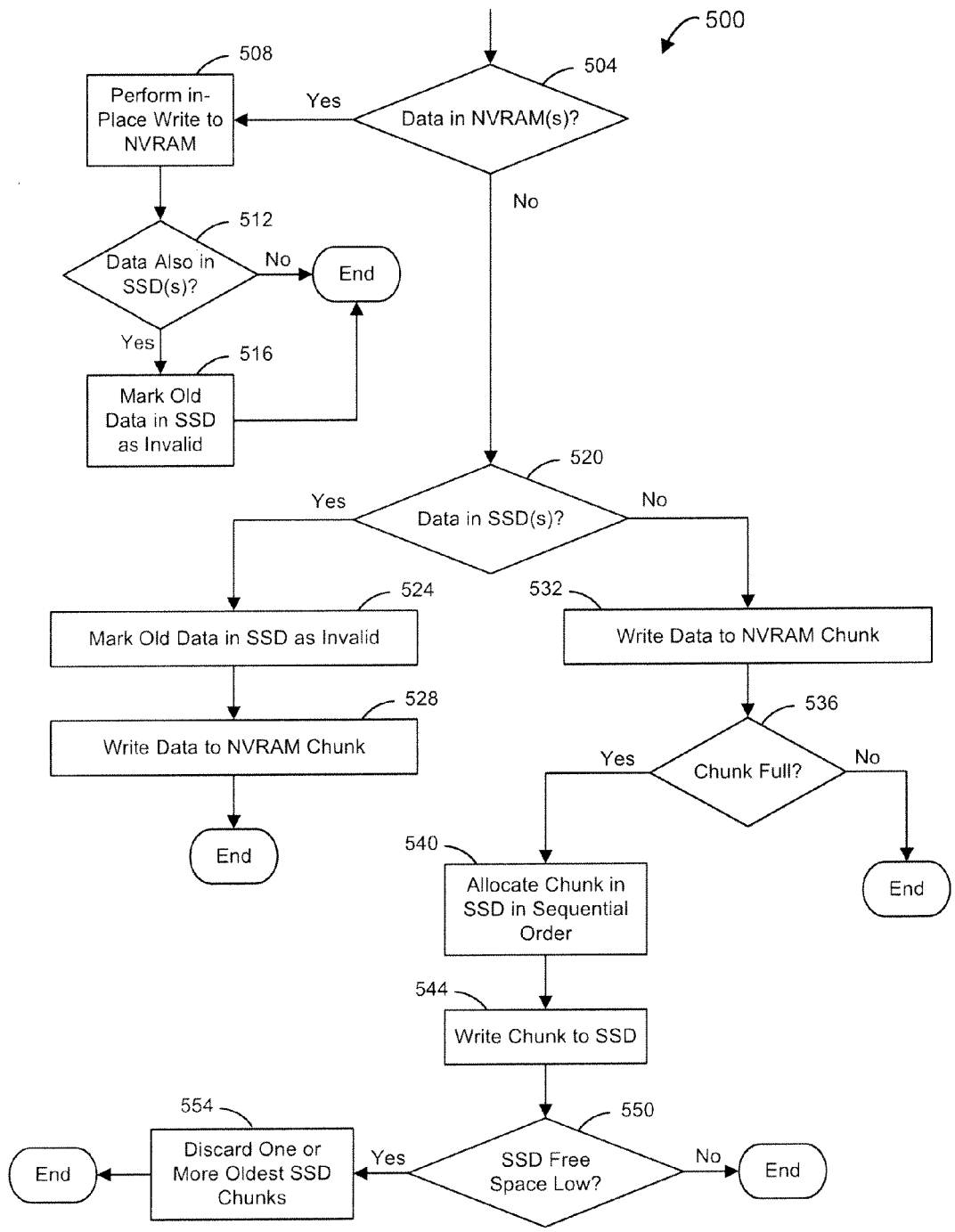
FIG. 5 is a flow diagram of an example method, implemented by the cache system of FIG. 1, for handling a request to populate data in a cache device, according to an embodiment.

FIG. 5 is a flow diagram of an example method 500, implemented by a cache system, for handling a cache population request, according to an embodiment. For example, the method 500 is implemented by the cache system 108 of FIG. 1, in an embodiment, and the method 500 is described with reference to FIG. 1 for ease of explanation. In other embodiments, however, the method 500 is implemented by other suitable cache systems that include one or more SSDs and one or more RAMs.

At block 504, it is determined whether old data corresponding to the cache population request is already stored in the NVRAM 116. If old data corresponding to the cache population request is already stored in the NVRAM 116, the flow proceeds to block 508. At block 508, the old data corresponding to the cache population request is overwritten in the NVRAM 116 with the write data associated with cache population request.

At block 512, it is determined whether old data corresponding to the cache population request is also already stored in the SSD 112. If old data corresponding to the cache population request is already stored in the SSD 112, the flow proceeds to block 516. At block 516, old data stored in the SSD 112 that corresponds to the cache population request is marked as invalid. On the other hand, if old data corresponding to the cache population request is not already stored in the SSD 112, the flow ends.

Referring again to block 504, if it is determined that old data corresponding to the cache population request is not already stored in the NVRAM 116, the flow proceeds to block 520. At block 520, it is determined whether old data corresponding to the cache population request is already stored in the SSD 112. If old data corresponding to the cache population request is already stored in the SSD 112, the flow proceeds to block 524.

At block 524, old data stored in the SSD 112 that corresponds to the cache population request is marked as invalid. At block 528, write data associated with the cache population request is stored in a chunk of the NVRAM 116. In an embodiment, a chunk in the NVRAM 116 is allocated prior to block 528 if necessary.

Referring again to block 520, if it is determined that old data corresponding to the cache population request is not already stored in the SSD 112, the flow proceeds to block 532. At block 532, write data associated with the cache population request is stored in a chunk of the NVRAM 116. In an embodiment, a chunk in the NVRAM 116 is allocated prior to block 532 if necessary.

At block 536, it is determined whether the chunk in the NVRAM 116 to which the write data was written at block 532 is full. Determining that the chunk in the NVRAM 116 is full comprises determining that at least a certain number of memory locations in the chunk have been written to since the most recent allocation of the chunk, in an embodiment. For example, determining when the chunk in the NVRAM 116 is full comprises determining that at least 95% of the memory locations in the chunk have been written to since the most recent allocation of the chunk, in an embodiment. In other embodiments, a suitable percentage other than 95% is utilized. For example, determining when the chunk in the NVRAM 116 is full comprises determining that 100% of the memory locations in the chunk have been written to since the most recent allocation of the chunk, in an embodiment. If the chunk is not full, the flow ends. On the other hand, if the chunk is full, the flow proceeds to block 540.

At block 540, a chunk in the SSD 112 is allocated in a sequential order with respect to the memory space of the SSD 112, as discussed above. At block 544, the chunk in the NVRAM 116 is written to the chunk in the SSD 112 allocated at block 540, in an embodiment.

At block 550, it is determined whether free space in the SSD 112 is low. Determining when free space in the SSD 112 is low comprises determining that at least a certain number of blocks in the SSD 112 are allocated, in an embodiment. For example, determining whether the SSD 112 is full comprises determining that at least 90% of the blocks in the SSD are allocated, in an embodiment. In other embodiments, a suitable percentage other than 90% is utilized. When it is determined that free space in the SSD 112 is not low, the flow ends. On the other hand, when it is determined that free space in the SSD 112 is low, the flow proceeds to block 554.

At block 554, one or more oldest chunks of the SSD 112 (e.g., one or more chunks that were last allocated prior to all other chunks in the SSD 112) are discarded. Discarding chunks at block 554 comprises discarding one or more chunks in the SSD 112 in a sequential manner with respect to the memory space of the SSD 112, such as discussed above.

In an embodiment, data written in the NVRAM 116 at blocks 508, 528, and 532 is generally written in anon-sequential order with respect to the memory space of the NVRAM 116. On the other hand, chunks in the SSD 112 are allocated sequentially (block 540) and data is written to the SSD 112 sequentially (block 544) sequentially with respect to the memory space of the SSD 112, in an embodiment. Similarly, chunks in the SSD 112 are discarded sequentially (block 554), in an embodiment.

In other embodiments, the method 500 is modified in various suitable ways. For instance, the order of blocks is changed, one or more blocks are omitted, one or more blocks are added, etc. in various embodiments.

The cache control system 118 is configured to implement the method 500, in an embodiment. For example, the cache engine 120 is configured to implement blocks 504, 512, and 520 in an embodiment. The cache engine 120 is also configured to implement blocks 508, 516, 524, 528, 532, and 544, in an embodiment. The SSD space manager 134 is configured to implement blocks 512, 516, 524, 540, 544, 550, and 554, in an embodiment. The NVRAM space manager 130 is configured to implement blocks 508, 528, and 544, in an embodiment.

At least some of the various blocks, operations, and techniques described above may be implemented utilizing hardware, a processor executing firmware instructions, a processor executing software instructions, or any combination thereof. For example, the cache control device 118 is implemented using one or more integrated circuit devices, in an embodiment. As another example, at least some of the blocks 120, 130, 134, 140, and 144 of the cache control device 118 are implemented using a processor executing machine readable instructions, in an embodiment.

When implemented utilizing a processor executing software or firmware instructions, the software or firmware instructions may be stored in any tangible, non-transitory computer readable memory such as a magnetic disk, an optical disk, a RAM, a read only memory (ROM), a flash memory, etc. The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device, etc.

While various embodiments have been described with reference to specific examples, which are intended to be illustrative only and not to be limiting, changes, additions and/or deletions may be made to the disclosed embodiments without departing from the scope of the claims.

What is claimed is:

1. An apparatus, comprising:
a cache system for a storage device, the cache system including (i) one or more solid state drives (SSDs), (ii) one or more random access memories (RAMs), and (iii) a cache control device, wherein the cache control device is configured to:
  receive first data that is to be written to the storage device, the first data associated with a request to write the first data to the storage device,
  store at least some of the first data in one or both of (i) the one or more SSDs and (ii) the one or more RAMs,
  retrieve second data from the storage device in response to a request to read data from the storage device,
  store at least some of the second data in one or both of (i) the one or more SSDs and (ii) the one or more RAMs,
  when storing first data or second data in one of the one or more RAMs, write to the one RAM non-sequentially with respect to a memory space of the one RAM, and
  when storing first data or second data in one of the one or more SSDs, write to the one SSD sequentially with respect to a memory space of the one SSD;
the apparatus further comprising:
  an SSD interface device configured to allocate chunks in each of the one or more SSDs sequentially with respect to the memory space of the SSD;
wherein:
  the cache control device comprises a data transfer device configured to
    for each chunk in the one or more RAMs, determine when the chunk in the one or more RAMs is full,
    when it is determined the chunk in the one or more RAMs is full, cause the SSD interface device to allocate a new chunk in the SSD, and
    cause data in the full chunk of the one or more RAMs to be written to the new chunk in the SSD.

2. The apparatus of claim 1, wherein the data transfer device is included in the RAM interface device.

3. The apparatus of claim 1, wherein at least one of the one or more SSDs comprises a flash memory device.

4. The apparatus of claim 1, wherein at least one of the one or more RAMs comprises a non-volatile RAM device.

5. The apparatus of claim 1, wherein the non-volatile RAM device comprises at least one of (i) a battery or (ii) a super capacitor.

6. The apparatus of claim 1, wherein the cache control device comprises one or more integrated circuits.

7. The apparatus of claim 1, wherein the cache control device comprises:
a memory to store machine readable instructions; and
a processor coupled to the memory, the processor configured to execute the machine readable instructions.

8. An apparatus, comprising:
a cache system for a storage device, the cache system including (i) one or more solid state drives (SSDs), (ii) one or more random access memories (RAMs), and (iii) a cache control device, wherein the cache control device is configured to:
  receive first data that is to be written to the storage device, the first data associated with a request to write the first data to the storage device,
  store at least some of the first data in one or both of (i) the one or more SSDs and (ii) the one or more RAMs,
  retrieve second data from the storage device in response to a request to read data from the storage device,
  store at least some of the second data in one or both of (i) the one or more SSDs and (ii) the one or more RAMs,
  when storing first data or second data in one of the one or more RAMs, write to the one RAM non-sequentially with respect to a memory space of the one RAM, and
  when storing first data or second data in one of the one or more SSDs, write to the one SSD sequentially with respect to a memory space of the one SSD;
wherein the cache control device comprises:
  a cache engine configured to
    receive a request to overwrite old data already in the storage device with second data, and
    in response to the request overwrite old data in the storage device, (i) determine whether the old data is in the one or more RAMs, and (ii) determine whether the old data is in the one or more SSDs;
  a RAM interface device configured to
    if the old data is in the one or more RAMs, overwrite the old data in the one or more RAMs with second data, and
    if the old data to be overwritten is not in the one or more RAMs, (i) allocate a chunk in the one or more RAMs, and (ii) write second data to the allocated chunk; and
  an SSD interface device configured to, if the old data is in the one or more SSDs, mark the old data in the one or more SSDs as invalid.

9. The apparatus of claim 8, wherein the SSD interface device is configured to discard chunks in each of the one or more SSDs sequentially with respect to the memory space of the SSD.

10. The apparatus of claim 9, wherein the SSD interface device is configured to discard one or more chunks in each of the one or more SSDs that were last allocated prior to the most recent allocations of all other chunks in the SSD.

11. A method, comprising:
receiving first data that is to be written to a storage device, the first data associated with requests to write first data to the storage device;
storing at least some of the first data in a cache device comprising (i) a solid state drive (SSD), and (ii) a random access memory (RAM), wherein:
storing first data to the SSD comprises writing sequentially to the SSD with respect to a memory space of the SSD, and
storing first data to the RAM comprises writing non-sequentially to the RAM with respect to a memory space of the RAM;
retrieving second data from the storage device in response to requests to read data from the storage device; and
storing at least some of the second data in the cache device, wherein:
storing second data to the SSD comprises writing sequentially to the SSD with respect to a memory space of the SSD,
storing first data to the RAM comprises writing non-sequentially to the RAM with respect to a memory space of the RAM;
for each chunk in the RAM, determining when the chunk in the RAM is full; and
when it is determined that the chunk in the RAM is full, allocating a chunk in the SSD according to an order corresponding to the memory space of the SSD, and
copying data from the full chunk in the RAM to the allocated chunk in the SSD.

12. The method of claim 11, further comprising:
determining whether first data corresponds to old data already stored in the RAM; and
when it is determined that first data corresponds to old data already stored in the RAM overwriting the old data in the RAM with the first data corresponding to the old data.

13. The method of claim 12, further comprising:
determining whether first data corresponds to old data already stored in the SSD; and
when it is determined that first data corresponds to old data already stored in the SSD, marking the old data in the SSD that corresponds to first data as invalid.

14. The method of claim 13, further comprising:
when it is determined (i) that first data does not corresponds to old data already stored in the RAM, and (ii) that first data corresponds to old data already stored in the SSD, writing first data to a chunk in the RAM.

15. The method of claim 11, further comprising:
determining when free space in the SSD is does not meet a threshold; and
when it is determined that the free space in the SSD does not meet the threshold, discarding one or more oldest chunks in the SSD, the oldest chunks corresponding to chunks that were last allocated prior to the most recent allocations of all other chunks in the SSD.

16. The method of claim 11, wherein discarding the one or more oldest chunks in the SSD comprises erasing the one or more chunks.

17. The method of claim 11, further comprising allocating chunks in the SSD sequentially with respect to the memory space of the SSD.

18. The method of claim 11, further comprising discarding chunks in the SSD sequentially with respect to the memory space of the SSD.

* * * * *